(12) United States Patent
Greene

(10) Patent No.: US 6,397,691 B1
(45) Date of Patent: Jun. 4, 2002

(54) DOUBLE REDUCTION GEAR DRIVE MEANS

(75) Inventor: Richard R. Greene, Port St. Lucie, FL (US)

(73) Assignee: Hi-Tide Sales, Inc., Fort Pierce, FL (US)

( * ) Notice: Subject to any disclaimer, the term of this patent is extended or adjusted under 35 U.S.C. 154(b) by 0 days.

(21) Appl. No.: 09/769,593

(22) Filed: Jan. 25, 2001

(51) Int. Cl.[7] ............................................. F16H 29/20
(52) U.S. Cl. ...................... 74/89.2; 74/425; 74/421 A; 74/89.14
(58) Field of Search ................. 74/425, 89.14, 74/89.2, 421 A; 405/3

(56) References Cited

U.S. PATENT DOCUMENTS

| | | | |
|---|---|---|---|
| 2,868,031 A | * 1/1959 | Schumb | 74/425 |
| 3,191,389 A | 6/1965 | Poe | |
| 3,265,024 A | 8/1966 | Kramlich | |
| 3,504,502 A | 4/1970 | Blount | |
| 3,675,258 A | 7/1972 | Osmundson | |
| 3,778,855 A | 12/1973 | Kariagin et al. | |
| 3,791,229 A | 2/1974 | Litezki | |
| 4,185,514 A | * 1/1980 | Edwards | 74/421 A |
| 4,337,868 A | 7/1982 | Gattu | |
| 4,346,728 A | * 8/1982 | Sulzer | 137/243.6 |
| 4,589,800 A | 5/1986 | Nasby, Jr. | |
| 4,641,996 A | 2/1987 | Seal | |
| 4,686,920 A | 8/1987 | Thomas | |
| 4,954,011 A | 9/1990 | Stenson | |
| 4,979,603 A | * 12/1990 | Wheatland | 192/150 |
| 4,983,067 A | 1/1991 | Montgomery | |
| 5,020,463 A | 6/1991 | Franklin et al. | |
| 5,051,027 A | 9/1991 | Horton | |
| 5,063,316 A | * 11/1991 | E-Ming | 200/500 |
| 5,090,842 A | 2/1992 | Montgomery | |
| 5,140,923 A | 8/1992 | Wood | |
| 5,211,124 A | 5/1993 | Reisor | |
| 5,261,347 A | 11/1993 | Mansfield | |
| 5,287,821 A | 2/1994 | Godbersen | |
| 5,345,834 A | * 9/1994 | Hayashi | 74/421 A |
| 5,390,616 A | 2/1995 | Roth | |
| 5,593,247 A | 1/1997 | Endres et al. | |
| 5,687,663 A | 11/1997 | Wahlstrand | |
| 5,701,834 A | 12/1997 | Lyons | |
| D390,188 S | 2/1998 | Norfolk et al. | |
| 5,755,529 A | 5/1998 | Follett | |
| 5,769,568 A | 6/1998 | Parkins et al. | |
| 5,772,360 A | 6/1998 | Wood, II | |
| 5,803,003 A | 9/1998 | Vickers | |
| 5,839,320 A | * 11/1998 | Komachi | 310/89 |
| 5,915,877 A | 6/1999 | Sargent et al. | |
| 5,934,826 A | 8/1999 | Mansfield | |
| 5,947,639 A | 9/1999 | Bishop et al. | |
| 5,957,623 A | 9/1999 | Sargent et al. | |
| 5,970,813 A | * 10/1999 | Parkins et al. | 114/366 |
| 5,988,941 A | 11/1999 | Sargent et al. | |
| 6,006,687 A | 12/1999 | Hillman et al. | |
| 6,021,692 A | 2/2000 | Norfolk et al. | |
| 6,033,148 A | 3/2000 | Norfolk et al. | |
| 6,044,723 A | * 4/2000 | Eda et al. | 180/443 |
| 6,122,994 A | 9/2000 | Norfolk et al. | |
| 6,305,236 B1 | * 10/2001 | Sturdevant | 74/421 A |

* cited by examiner

*Primary Examiner*—Paul N. Dickson
*Assistant Examiner*—Xuan Lan Nguyen
(74) *Attorney, Agent, or Firm*—Sperry, Zoda & Kane (57) ABSTRACT

A double gear reduction drive mechanism for powering movement of a boat lifting cable for moving of a watercraft upwardly from the water to an elevated position and downwardly from the elevated position of storage to a position in the water therebelow. The device includes two gear reduction mechanisms within the same housing or within separate adjacent housings which can be connected to a drive means for powering rotational movement of a cable spool with at least one boat lift cable attached thereto. This gear drive is a direct drive system since it does not include any belts, chains or pulleys but utilizes direct engagement between two immediately adjacently positioned pairs of gears each of which reduces rotational speed to effect an increase in power, torque and accurate control of movement of boat lifting cable.

25 Claims, 3 Drawing Sheets

DOUBLE REDUCTION GEAR DRIVE MEANS

BACKGROUND OF THE INVENTION

1. Field of the Invention

The present invention deals with the field of devices for controlling boat lift apparatus. Boat lift apparatus is used normally adjacent large bodies of water for removing a boat or other watercraft from the water to an elevated position for storage. This is normally controlled by a cable mechanism attached to the boat lift apparatus.

This boat lift cable must be accurately controlled for movement and the present invention provides a double reduction gear drive for powering movement of such boat lifting cables which is significantly improved since it utilizes direct engagement of gearing rather than chains or pulleys or other remote means for connecting rotating shafts. Also the mutual orientation of the axis of the input shaft, the internal shaft, the output shaft and the winding spool provide a distinct improvement over the prior art since lubrication is significantly enhanced and smaller sized designs can be utilized. The maintenance requirements for chain and belt drive systems is problematic in the relatively harsh environments that are normally experienced at the locations where such boat lifts are utilized. For this reason the use of a direct drive double reduction gear mechanism is a significant enhancement over the prior art.

2. Description of the Prior Art

Various prior art devices have been utilized for the purposes of controlling movement of boat lifting mechanisms such as shown in U.S. Pat. No. 3,191,389 patented Jun. 29, 1965 to J. B. Poe on a "Boat Lift"; and U.S. Pat. No. 3,265,024 patented Aug. 9, 1966 to C. W. Kramlich on a "Boat Lift"; and U.S. Pat. No. 3,504,502 patented Apr. 7, 1970 to L. H. Blount on a "Lift Dock For A Water Borne Vessel"; and U.S. Pat. No. 3,675,258 patented Jul. 11, 1972 to Bradley M. Osmundson on a "Boat Hoist"; and U.S. Pat. No. 3,778,855 patented Dec. 18, 1973 to Nikolai Kariagin et al and assigned to Whittaker Corporation on a "Telescopic Gravity Davit"; and U.S. Pat. No. 3,791,229 patented Feb. 12, 1974 to Heinz Litezki and assigned to Schiess Aktiengesellschaft on a "Lifting Device For Lifting And Lowering Heavy Loads"; and U.S. Pat. No. 4,337,868 patented Jul. 6, 1982 to Narahari Gattu and assigned to Harnischfeger Corporation on a "Telescopic Crane Boom Having Rotatable Extend/Retract Screws"; and U.S. Pat. No. 4,589,800 patented May 20, 1986 to Charles L. Nasby, Jr. on a "Dock Structure And Method And Apparatus For Raising And Lowering Same"; and U.S. Pat. No. 4,641,996 patented Feb. 10, 1987 to Morton Seal on a "Side Loading Boat Lifts"; and U.S. Pat. No. 4,686,920 patented Aug. 18, 1987 to James L. Thomas on a "Cradle Type Boat Lifts"; and U.S. Pat. No. 4,954,011 patented Sep. 4, 1990 to Samuel H. Stenson on a "Powered Method And Apparatus For Lifting A Boat"; and U.S. Pat. No. 4,983,067 patented Jan. 8, 1991 to David M. Montgomery on a "Boat Lift Apparatus"; and U.S. Pat. No. 5,020,463 patented Jun. 4, 1991 to Robert E. Franklin et al on an "Arrangement For Raising Or Lowering Boats Or The Like"; and U.S. Pat. No. 5,051,027 patented Sep. 24, 1991 to George F. Horton on a "Boat Lift"; and U.S. Pat. No. 5,090,842 patented Feb. 25, 1992 to David M. Montgomery on a "Boat Lift Apparatus And System"; and U.S. Pat. No. 5,140,923 patented Aug. 25, 1992 to Kevin L. Wood on a "Raising And Lowering Device"; and U.S. Pat. No. 5,211,124 patented May 18, 1993 to John N. Reiser and assigned to Triton Corporation on a "Winch Construction For Boat Lift"; and U.S. Pat. No. 5,261,347 patented Nov. 16, 1993 to Peter W. Mansfield on a "Sailboat Davit"; and U.S. Pat. No. 5,287,821 patented Feb. 22, 1994 to Byron L. Godbersen on an "Electric Drive Mechanism For Boat Hoist Winch"; and U.S. Pat. No. 5,390,616 patented Feb. 21, 1995 to Henry Roth on a "Dock Mounted Small Boat Lifting System"; and U.S. Pat. No. 5,593,247 patented Jan. 14, 1997 to James A. Endres et al and assigned to Endcor Inc. on a "Programmable Boat Lift Control System"; and U.S. Pat. No. 5,687,663 patented Nov. 18, 1997 to Noel D. Wahlstrand on a "Boat Lift Transport Apparatus"; and U.S. Pat. No. 5,701,834 patented to Richard A. Lyons on Dec. 30, 1997 on a "Lift For Watercraft"; and U.S. Pat. No. 5,755,529 patented May 26, 1998 to R. R. Brad Follett on a "Boat Lift"; and U.S. Pat. No. 5,769,568 patented Jun. 23, 1998 to David G. Parkins et al and assigned to ABL Boat Lifts on an "Adaptable Boat Lift"; and U.S. Pat. No. 5,772,360 patented Jun. 30, 1998 to Donald M. Wood, II on a "Topless Watercraft Lifting Apparatus With A Differential Gearing System"; and U.S. Pat. No. 5,803,003 patented Sep. 8, 1998 to Robert V. Vickers and assigned to The Louis Berkman Company on a "Rotary Boat Lift"; and U.S. Pat. No. 5,915,877 patented to Charles L. Sargent et al on Jun. 29, 1999 and assigned to Quality Boat Lift, Inc. on a "Positive Drive Boat Lift"; and U.S. Pat. No. 5,934,826 patented Aug. 10, 1999 to Peter W. Mansfield on a "Boat Lift Apparatus"; and U.S. Pat. No. 5,947,639 patented Sep. 7, 1999 to Richard B. Bishop et al on a "Boat Lift Apparatus"; and U.S. Pat. No. 5,957,623 patented to Charles L. Sargent et al on Sep. 28, 1999 and assigned to Quality Boat Lifts Inc. on an "Electrically Insulated Positive Drive Boat Lift"; and U.S. Pat. No. 5,988,941 patented Nov. 23, 1999 to Charles L. Sargent et al and assigned to Quality Boat Lifts, Inc. on a "Boat Lift Cable Lock Apparatus"; and U.S. Pat. No. 6,006,687 patented Dec. 28, 1999 to Jeffrey M. Hillman et al and assigned to Marine Floats, Inc. on a "Modular Floating Boat Lift"; and U.S. Pat. No. 6,033,148 patented Mar. 7, 2000 to Lynn P. Norfolk et al and assigned to Norfolk Fabrication, Inc. on a "Housing For A Boat Lift Motor, Pulley And Gear Drive"; and U.S. Pat. No. 6,122,692 patented Feb. 8, 2000 to Lynn P. Norfolk et al and assigned to Norfolk Fabrication, Inc. on a "Housing For A Boat Lift Motor Pulley And Gear Drive" and U.S. Pat. No. 6,122,994 patented Sep. 26, 2000 to Lynn P. Norfolk et al and assigned to Norfolk Fabrication, Inc. on a "Housing For A Boat Lift Motor, Pulley And Gear Drive"; and United States Design Patent No. Des. 390,188 patented Feb. 3, 1998 to Lynn P. Norfolk et al and assigned to Norfolk Fabrication, Inc. on a "Boat Lift Motor And Gear Housing".

SUMMARY OF THE INVENTION

The present invention provides a double reduction gear drive device for powering movement of a boat lifting cable which includes a main housing defining a main housing chamber therein. The main housing also preferably defines an input aperture and an output aperture therein both in fluid flow communication with respect to the main housing chamber.

An input shaft is also included rotatably mounted with respect to the main housing and extending through the input aperture into the main housing chamber. A primary input shaft bearing is also included mounted in the main housing immediately adjacent the input aperture. This primary input shaft bearing is adapted to receive the input shaft extending therethrough to facilitate rotational movement thereof relative to the main housing.

A secondary input shaft bearing may also be included mounted in the housing spatially disposed from the primary input shaft bearing and adapted to receive the input shaft therethrough in order to facilitate rotational movement thereof relative to the main housing.

An input gear is also preferably included secured to the input shaft at a position within the main housing chamber. An internal shaft is rotatably movably mounted within the main housing chamber of the main housing in a position extending approximately parallel to the input shaft and slightly displaced laterally therefrom. This input shaft and the internal shaft are both oriented in a generally vertically plane parallel with respect to one another.

A main internal gear may be also included secured on the internal shaft to be rotatable therewith. This main internal gear is preferably in engagement with respect to the input gear in such a manner as to be rotatably driven responsive to rotation of the input gear. The main internal gear is preferably larger than the input gear in order to cause the internal shaft to rotate at a rotational speed less than the rotational speed of the input shaft. A first internal shaft bearing may also be mounted within the main housing in such a manner as to receive the internal shaft extending therethrough to facilitate rotational movement thereof relative to the main housing. Similarly a second internal shaft bearing may be mounted within the main housing spatially disposed from the first internal shaft bearing. It is adapted to receive the internal shaft extending therethrough to facilitate rotation thereof relative to the main housing.

A worm gear is also preferably included secured on the internal shaft for rotation therewith. This worm gear is positioned at an intermediate position on the internal shaft spatially disposed from the main internal gear.

A main bearing journal is also preferably fixedly mounted within the main housing chamber. Preferably the second input shaft bearing and the first internal shaft bearing are both mounted in the main bearing journal and maintained thereby spatially disposed from one another to maintain fixed positioning thereof relative to the main housing.

An output shaft is also movably mounted within the main housing chamber of the main housing to be rotatable with respect thereto. The output shaft is positioned to also extend outwardly through the output aperture. The output shaft and the internal shaft are preferably oriented in a generally vertically extending plane and are oriented approximately perpendicular with respect to one another. The output shaft is partially positioned within the main housing and extends outwardly therefrom through the output aperture. A first output shaft bearing and a second output shaft bearing are also mounted within the main housing spatially disposed from one another and adapted to receive the output shaft extending therethrough to facilitate rotational movement thereof relative to the main housing.

An output gear is secured to the output shaft to be rotatable therewith and is positioned in engagement with respect to the worm gear to move therewith. The output gear is preferably larger than the worm gear to cause the output shaft to rotate at a rotational speed less than the rotational speed of the internal shaft.

A boat lifting cable spool is attached to the output shaft outside of the main housing chamber and is rotatable therewith to control winding of one or more boat lifting cables thereon. The boat lifting cable spool extends generally horizontally preferably and approximately perpendicular with respect to the internal shaft and the input shaft.

A drive means is operatively coupled with respect to the input shaft to selectively drive it. In this manner it will cause rotation of the boat lifting cable spool with enhanced torque and lower rotational velocity than the drive means itself in order to control movement of the boat lifting cable. The drive means preferably includes a drive shaft extending outwardly therefrom and being rotationally driven therewith. The drive shaft is coupled to the input shaft for selectively causing rotation thereof.

A boat lifting cable can also be included in a position secured to the boat lifting cable spool for controlling winding thereof on the spool. Two such boat lifting cables are normally utilized spaced apart on the spool.

A coupling means may also be attached to the drive shaft and the input shaft in order to cause simultaneous and similar movement therebetween. The coupling means preferably includes a key means positioned between the first drive shaft and the coupling means for securing them to one another. Another keying means is included positioned between the input shaft and the coupling for selectively securing them with respect to one another.

A coupling housing may also be included extending around the coupling itself. This coupling housing will preferably define a coupling chamber therein and a coupling input aperture and outlet aperture. The coupling housing is preferably securable with respect to the drive with the drive shaft thereof extending into the coupling through the coupling input aperture. The coupling also is preferably securable with respect to the main housing with the coupling aperture positioned in registration with respect to the main housing input aperture and with the input shaft extending through the coupling output aperture into the coupling chamber to a position adjacent the drive shaft. The coupling is preferably rotatably movable with respect to the coupling chamber and is secured to the drive shaft and input shaft to cause similar rotational movement. The coupling housing also includes a coupling bearing mounted therein immediately adjacent the coupling output aperture which is adapted to receive the input shaft therethrough to facilitate rotation thereof relative to the coupling housing.

The main housing of the present invention may include an enlarged wall section adjacent the first output shaft bearing in order to facilitate placement and lubrication thereof. Also the output gear may actually be configured as a helical flange gear as shown best in FIGS. 1 and 2 to facilitate engagement thereof with respect to the worm gear. Also the worm gear itself is preferably constructed with the teeth thereof having a lead angle of less than 7 degrees and 30 minutes in order to avoid backdriving thereof and enhance self-locking characteristics.

It is important to appreciate that the present invention is positionable with the two gear reduction mechanisms within a single housing. However, it is also contemplated within the scope of the present invention that the gear reduction mechanisms can each be positioned within their own housing. In this case the main overall housing can be defined as the composite of the two housings wherein the first step of gear reduction occurs in the first housing member and the second step of gear reduction occurs in the second housing member. This could be easily achieved merely by defining two separate housing members which comprise the overall housing itself with one set of reduction gears located in one housing and the second set of reduction gears located in a second immediately adjacent housing.

It is object of the present invention to provide a double reduction gear drive mechanism for powering movement of boat lifting cables wherein two steps of gear reduction are achieved with two sets of reducing gears in direct engagement with respect to one another thereby eliminating the need for any chain or belt operatively interconnecting the rotating shafts of the reduction means.

It is object of the present invention to provide a double reduction gear drive mechanism for powering movement of boat lifting cables wherein controlled operation of a boat lift is achieved.

It is object of the present invention to provide a double reduction gear drive mechanism for powering movement of boat lifting cables wherein a horizontally extending boat cable spool is operatively controlled for achieving full functionality of a boat lift.

It is object of the present invention to provide a double reduction gear drive mechanism for powering movement of boat lifting cables wherein lubrication is significantly enhanced.

It is object of the present invention to provide a double reduction gear drive mechanism for powering movement of boat lifting cables wherein two pairs of reduction gears are included which may be positioned within the same housing or may be separated and positioned within adjacent housings.

It is object of the present invention to provide a double reduction gear drive mechanism for powering movement of boat lifting cables wherein all reduction gearing is achieved by direct interconnection of gear teeth rather than use of any indirect connection such as chains and sprockets or V-belts and pulleys.

It is object of the present invention to provide a double reduction gear drive mechanism for powering movement of boat lifting cables wherein maintenance requirements are minimized.

It is object of the present invention to provide a double reduction gear drive mechanism for powering movement of boat lifting cables wherein parts replacement is greatly facilitated.

It is object of the present invention to provide a double reduction gear drive mechanism for powering movement of boat lifting cables wherein a drive means is connected through a direct drive to the boat lifting cable winding spool.

It is object of the present invention to provide a double reduction gear drive mechanism for powering movement of boat lifting cables wherein self-locking and anti backdriving is achieved by utilizing a worm gear with a lead angle of less than 7 degrees and 30 minutes.

It is object of the present invention to provide a double reduction gear drive mechanism for powering movement of boat lifting cables wherein no exposed mechanical parts extend outside of the housing means.

It is object of the present invention to provide a double reduction gear drive mechanism for powering movement of boat lifting cables wherein a one-piece gear housing can be utilized.

It is object of the present invention to provide a double reduction gear drive mechanism for powering movement of boat lifting cables wherein a compact low profile design provides an aesthetically pleasing external appearance.

It is object of the present invention to provide a double reduction gear drive mechanism for powering movement of boat lifting cables wherein capacities from 4500 lbs. to 120,000 lbs. are achievable.

It is object of the present invention to provide a double reduction gear drive mechanism for powering movement of boat lifting cables wherein the housing can be sealed to provide a totally maintenance free environment under certain conditions.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a means for controlling operation of a boat lift by accurately controlling the powering and operation of one more boat lifting cables 10 and 11. The apparatus of the present invention preferably includes a main housing 12 which defines a main housing chamber 14 therein. Main housing chamber 14 is in fluid flow communication with respect to an input aperture 16 and an output aperture 18 both defined in the external surface of the main housing means 12. The input aperture 16 is adapted to receive power thereinto and the output aperture 18 is designed to provide power outwardly therefrom. Preferably the output aperture 18 is spatially positioned away from the input aperture 16.

The double reduction gear drive of the present invention preferably includes an input shaft 20 which extends through the input aperture 16 of main housing 12 and is rotatable with respect thereto. Preferably this rotation is achieved by having the input shaft 20 extend through a primary input shaft bearing 22 positioned immediately adjacent the input aperture 16 in the main housing 12. A secondary input shaft bearing 24 is preferably positioned within the main housing chamber 14. A main bearing journal 38 may be included in the main housing 12 within the main housing chamber 14 thereof and may be adapted to receive the secondary input shaft bearing 24 mounted therein. In this manner input shaft 20 will extend through the primary input shaft bearing 22 and through the secondary input shaft bearing 24 as well as through the input aperture 16. Thus the input shaft 20 will be rotatably movable with respect to the housing and will extend from a position within the main housing chamber 14 through the input aperture 16 to a position external of the main housing chamber 14.

An input gear 26 is preferably secured fixedly to the input shaft 20 at a position within the main housing chamber 14.

An internal shaft 28 will preferably be contained entirely within the main housing 12 and will be positioned to be freely rotatable with respect to the main housing 12 by being mounted within a first internal shaft bearing 32 and a second internal shaft bearing 34. Both shaft bearings 32 and 34 will be positioned within the main housing 12 with one preferably and optionally being positioned within the main bearing journal 38 at a position spatially disposed from the secondary input shaft bearing 24 mounted therein.

With the above-described configuration a main internal gear 30 is preferably fixedly mounted on the internal shaft 28 at a position immediately adjacent to the input gear 26 mounted on the input shaft 20. As such, gear 30 and gear 26 are directly meshed with one another to provide direct gear powering therebetween. Thus, rotational movement of the input gear 26 will cause similar rotational movement of the main internal gear 30. Preferably main internal gear 30 will be larger than the input gear 26 thereby achieving the first level of gear reduction desired by the apparatus of the present invention.

A worm gear 36 is mounted preferably at an intermediate location on the internal shaft 28. Preferably the internal shaft 28 will include the first internal shaft bearing 32 mounted in the main bearing journal 38 and the second internal shaft bearing 34 mounted in the wall of the main housing 12. Thus, rotation of the internal shaft 30 will cause similar rotation of the worm gear 36.

Figure 2:
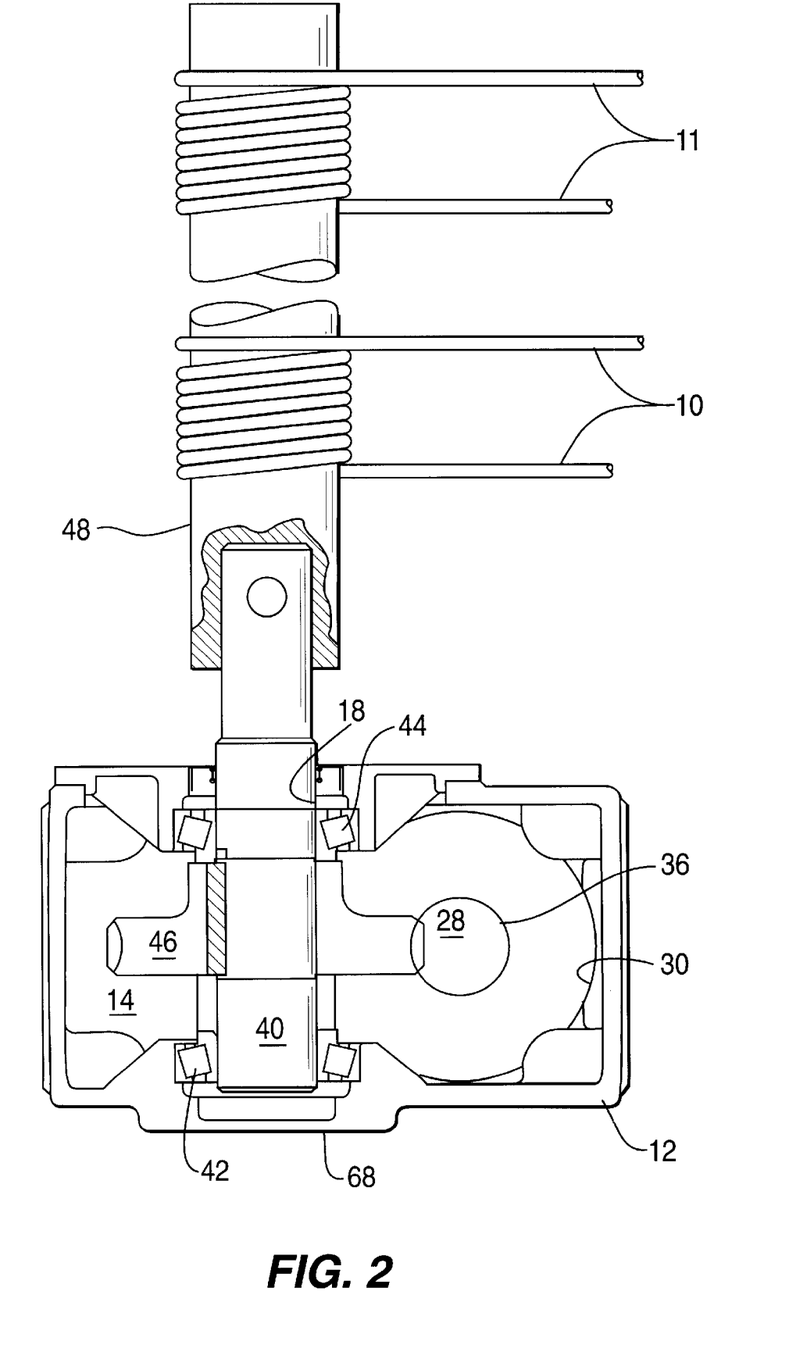
FIG. 2 is a top cross-sectional view of the embodiment shown in FIG. 1.
Figure 3:
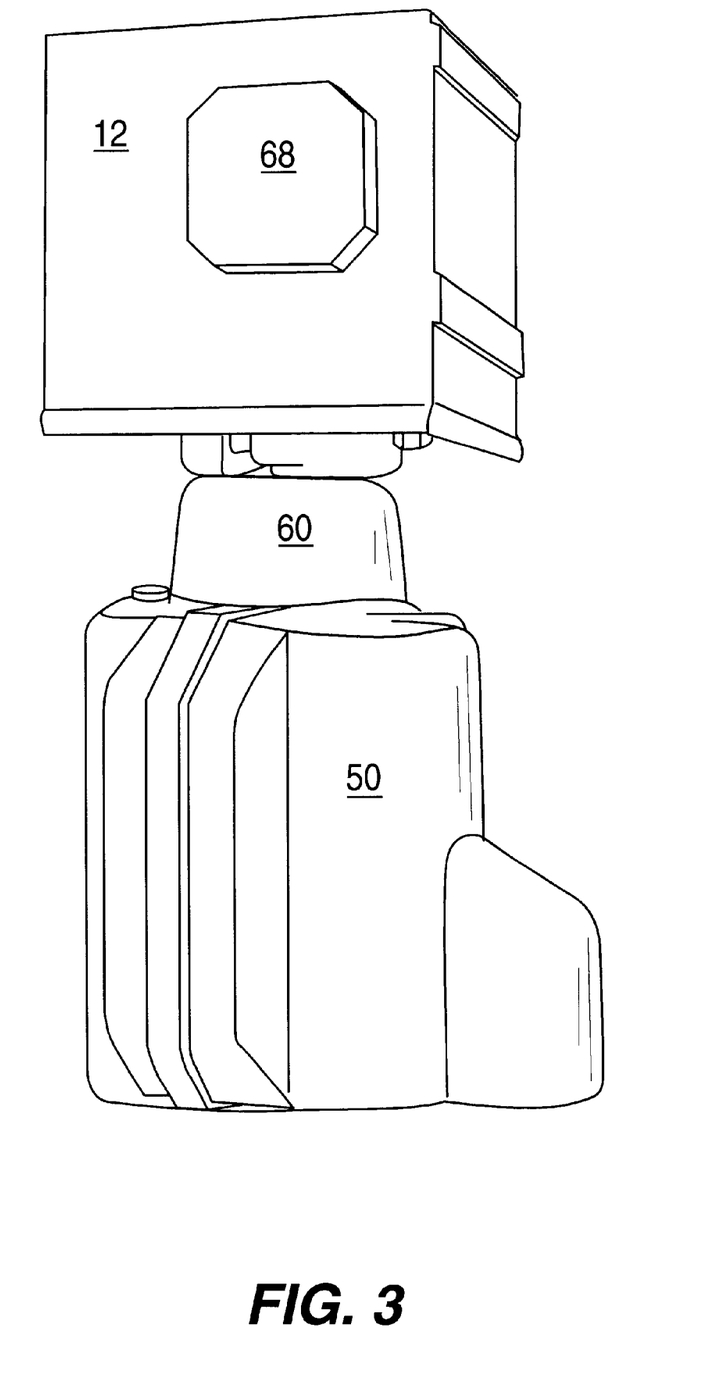
FIG. 3 is a front perspective illustration of an embodiment of the double gear reduction drive means of the present invention showing the complete external housing thereof.

An output shaft 40 is also preferably included in the apparatus of the present invention which will preferably extend through the output aperture 18 and be rotatably movable with respect thereto. Output shaft 40 will preferably be positioned within a first output shaft bearing 42 and a second output shaft bearing 44 both positioned within the main housing 12 and preferably within the wall area thereof. In a preferred configuration as shown in FIG. 2 the first output shaft bearing 42 will require the inclusion of an enlarged wall section 68 in the main housing 12 to allow sufficient clearance on both sides of an output gear 46. Output gear 46 is a large preferably helical flange gear which requires significant clearance therearound for lubrication and effective operation thereof. The enlarged section 68 in the external wall of the main housing 12 helps achieve this purpose.

Helical flange output gear 46 is preferably in engagement with worm gear 36. Since gear 46 is significantly larger than worm gear 36 the second stage of gear reduction is achieved by this direct drive gear connection. These two gears are intermeshed with respect to one another to achieve this solid reliable element of gear reduction. Preferably the second output shaft bearing 44 will be positioned immediately adjacent to and in registration with respect to the output aperture 18 of main housing 12.

The output shaft 40 preferably will include a boat lifting cable spool 48 secured thereto at a location outside of the main housing 12, external of the main housing chamber 14. This spool will allow the boat lifting cables 10 and 11 to be wound therearound such that rotation of the output shaft 40 will cause similar rotation of the boat lifting cable spool 48 and allow operative control of positioning of the boat lifting cable 10. In the preferred configuration the boat lifting cable spool 48 is shown with two boat lifting cables 10 and 11 mounted thereon, however the actual number of boat lifting cables can be one or more.

Figure 1:
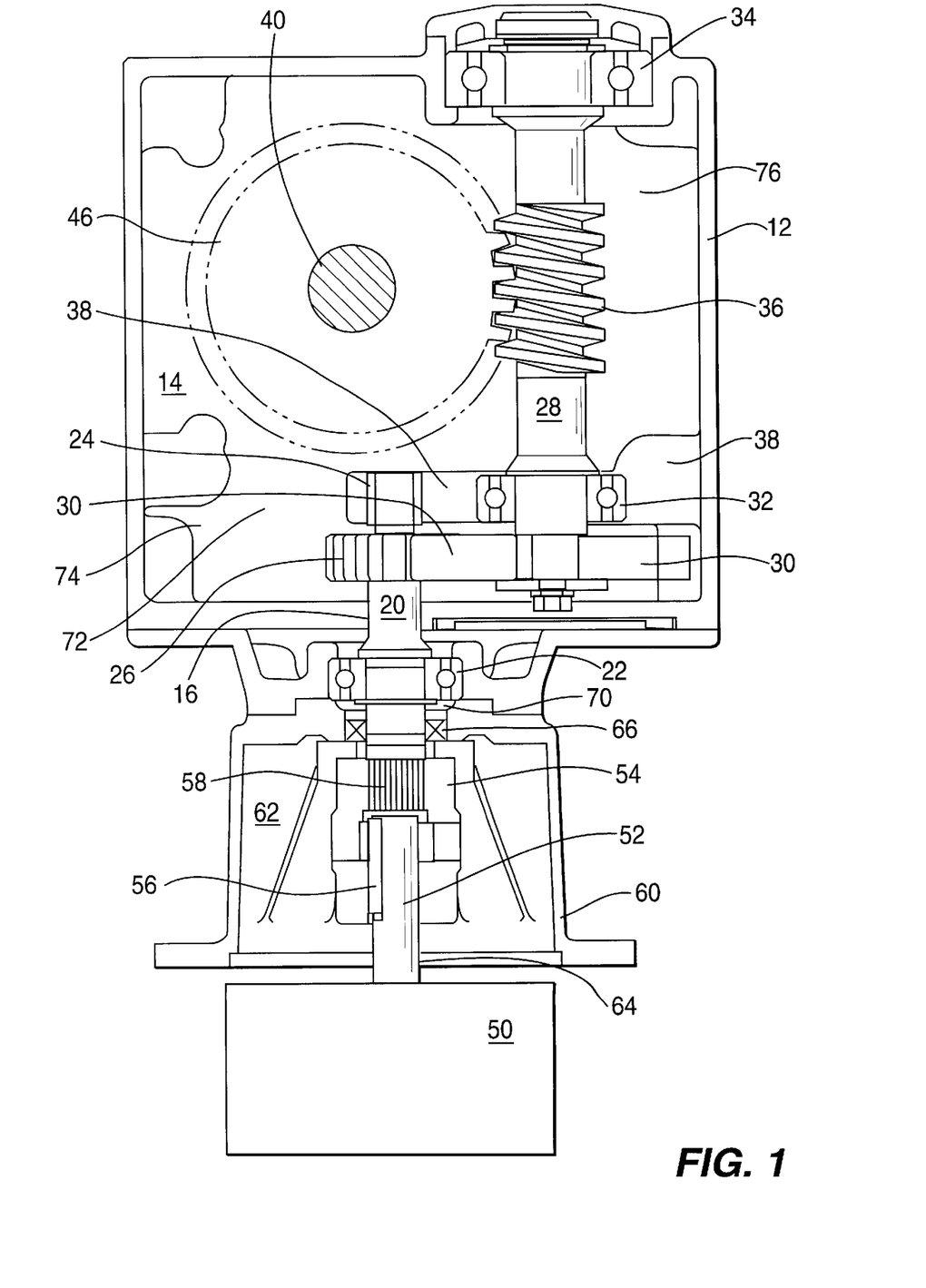
FIG. 1 is a front cross-sectional view of an embodiment of the double reduction gear drive means of the present invention.

A drive means 50 may also be included in the present invention to provide powering for rotation of the input shaft 20. This drive means 50 preferably includes a drive shaft 52 rotatably driven thereby and extending outwardly therefrom. A coupling 54 is preferably positioned adjacent the drive shaft 52 and preferably is fixedly secured thereto. Similarly the coupling 54 is preferably secured fixedly with respect to the input shaft 20 such that rotation of the drive shaft 52 will cause similar rotation of the input shaft 20. The coupling between the drive shaft 52 and the coupling means 54 is achieved by a first keying means 56. As shown in FIG. 1 this keying means can comprise a single keying stud. Similarly direct connection between the coupling 54 and the input shaft 20 can be achieved by a second keying means 58 which can comprise a plurality of splines. The specific configuration of the first keying means 56 and the second keying means 58 can be of any conventionally available keying means for achieving simultaneous rotation of a shaft and a collar, coupling or other member extending therearound.

To protect the coupling 54 from the external environment a coupling housing 60 may extend therearound. Preferably coupling housing 60 defines a coupling chamber 62 therein in which the coupling 54 is located. Coupling housing 60 defines a coupling input aperture 64 through which the drive shaft 52 extends such that it can be keyed to the coupling 54 within the coupling chamber 62. The coupling outlet aperture 70 defined in the coupling housing 60 is designed to receive the input shaft 20 extending therethrough such that it can reach to a position immediately adjacent the coupling 54 for engagement therewith. A coupling housing bearing 66 is preferably positioned within the coupling housing 60 at a position immediately adjacent to the coupling outlet aperture 70 thereof and preferably in registration therewith for the purpose of receiving the input shaft 20 extending therethrough for maintaining alignment between the coupling housing 60 and the main housing 12. In order to achieve proper operation of the apparatus of the present invention the coupling output aperture 70 should be positioned in registration with respect to the input aperture 16 of the main housing 12.

It should be appreciated that in the configuration of the present invention it is contemplated that various embodiments can include the positioning of the gear reduction elements in a single housing or in two separate housings. As shown best in FIG. 1 the main housing 12 can be divided by an interior housing wall 72 into a first housing member 74 containing the gear reduction resulting from engagement of input gear 26 and main internal gear 30. A second housing member 76 can be defined also within the main housing member 12 which contains the gear reduction achieved by the engagement between the worm gear 36 and the output gear 46. These two different pairs of gears can both be positioned within the same housing or in separate housings and, if they are positioned in separate housings, the construction which achieves the separate housing can be of many different varieties of possible configurations. One such configuration is shown by the dotted lining in FIG. 1 which shows the main bearing journal 38 extended outwardly to such an extent that it provides an internal wall or panel within the main housing chamber 14 which divides first housing member 74 from second housing member 76. Thus, in this specific configuration, the main bearing journal 38 would not only contain bearings 24 and 32 but will also provide an interior housing wall 72 which minimizes fluid flow communication between the first housing member 74 and the second housing member 76. This is one particular manner in which the gear reduction can occur in separate non-communicating chambers. The separation of each direct drive gear reduction mechanism is not necessary but is possible under various operating and application conditions. In a preferred configuration as shown in the solid line portions of FIGS. 1 and 2 both gearing reductions will occur within a single housing. Applicant has defined that housing as a main housing means such that it can comprise a single housing or multiple independent housings all of which come within the definition of a main housing means.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A double reduction gear drive means for powering movement of a boat lifting cable comprising:
   A. a main housing means defining a main housing chamber means therewithin, said main housing means defining an input aperture means and an output aperture means therein with both being in fluid flow communication with respect to said main housing chamber means;
   B. an input shaft means rotatably movably mounted with respect to said main housing means and extending through said input aperture means into said main housing chamber means;
   C. an input gear means secured onto said input shaft means at a position within said main housing chamber means;
   D. an internal shaft means rotatably movably mounted within said main housing chamber means of said main housing means extending approximately parallel to said input shaft means and spatially displaced therefrom;
   E. a main internal gear means secured onto said internal shaft means to be rotatable therewith and in engagement with respect to said input gear means to be rotatably driven responsive to rotation of said input gear means, said main internal gear means being larger than said input gear means to cause said internal shaft means to rotate at a rotational speed less than the rotational speed of said input shaft means;
   F. a worm gear means secured onto said internal shaft means to be rotatable therewith;
   G. an output shaft means rotatably movably mounted within said main housing chamber means of said main housing means extending approximately perpendicularly with respect to said internal shaft means, said output shaft means being partially positioned within said main housing chamber means and extending outwardly therefrom through said output aperture means;
   H. an output gear means secured onto said output shaft means to be rotatable therewith and being positioned in engagement with respect to said worm gear means to be rotatable responsive to rotation thereof, said output gear means being larger than said worm gear means to cause said output shaft means to rotate at a rotational speed less than the rotational speed of said internal shaft means;
   I. a boat lifting cable spool means attached to said output shaft means outside of said main housing chamber means and being rotatably therewith to control winding of at least one boat lifting cable thereupon; and
   J. a drive means operatively coupled with respect to said input shaft means for selectively driving thereof to cause rotation of said boat lifting cable spool means with more torque and less rotational velocity than said drive means for controlling movement of boat lifting cable attached thereto.

2. A double reduction gear drive means for powering movement of a boat lifting cable as defined in claim 1 wherein said worm gear means is secured to said internal shaft means at a position spatially disposed from said main internal gear means.

3. A double reduction gear drive means for powering movement of a boat lifting cable as defined in claim 1 wherein said worm gear means is secured to said internal shaft means at an intermediate position thereon.

4. A double reduction gear drive means for powering movement of a boat lifting cable as defined in claim 1 further comprising a boat lifting cable means secured to said boat lifting cable spool means for controlling winding thereof.

5. A double reduction gear drive means for powering movement of a boat lifting cable as defined in claim 1 comprising a first boat lifting cable means and a second boat lifting cable means both attached to said output shaft means at a location outside of said main housing chamber means.

6. A double reduction gear drive means for powering movement of a boat lifting cable as defined in claim 1 wherein said drive means includes a drive shaft means extending outwardly therefrom and rotationally driven thereby, said drive shaft means being coupled to said input shaft means for selectively causing rotation thereof.

7. A double reduction gear drive means for powering movement of a boat lifting cable as defined in claim 6 further comprising a coupling means attached to said drive shaft means and to said input shaft means for causing simultaneous similar movement therebetween.

8. A double reduction gear drive means for powering movement of a boat lifting cable as defined in claim 7 wherein said coupling means includes a first key means positioned between said drive shaft means and said coupling means for selectively achieving securement therebetween and further includes a second key means positioned between said input shaft means and said coupling means for selectively achieving securement therebetween.

9. A double reduction gear drive means for powering movement of a boat lifting cable as defined in claim 7 further including a coupling housing means extending around said coupling means, said coupling housing means defining a coupling chamber means therewithin and a coupling input aperture means and a coupling output aperture means in communication therewith, said coupling housing means being securable with respect to said drive means with said drive shaft means thereof extending into said coupling housing means through said coupling input aperture means, said coupling means also being securable with respect to said main housing means with said coupling output aperture means in registration with respect to said main housing input aperture means and with said input shaft means extending through said coupling output aperture means into said coupling chamber means to a position adjacent said drive shaft means, said coupling means being rotatably movable within said coupling chamber means and secured to said drive shaft means and said input shaft means to cause similar simultaneous rotational movement thereof.

10. A double reduction gear drive means for powering movement of a boat lifting cable as defined in claim 9 wherein said coupling housing means includes a coupling housing bearing means mounted therewithin immediately adjacent said coupling output aperture means and being adapted to receive said input shaft means therethrough to facilitate rotation thereof relative to said coupling housing means.

11. A double reduction gear drive means for powering movement of a boat lifting cable as defined in claim 1 wherein said output shaft means and said internal shaft means are oriented in a generally vertically extending plane and extend approximately perpendicularly with respect to one another.

12. A double reduction gear drive means for powering movement of a boat lifting cable as defined in claim 1 further comprising a primary input shaft bearing means mounted in said main housing means immediately adjacent said input aperture means, said primary input shaft bearing means adapted to receive said input shaft means therethrough to facilitate rotational movement thereof relative to said main housing means.

13. A double reduction gear drive means for powering movement of a boat lifting cable as defined in claim 12 further comprising a secondary input shaft bearing means mounted in said housing means spatially disposed from said primary input shaft bearing means and adapted to receive said input shaft means therethrough to facilitate rotational movement thereof relative to said main housing means.

14. A double reduction gear drive means for powering movement of a boat lifting cable as defined in claim 13 further comprising a first internal shaft bearing means and a second internal shaft bearing means mounted within said main housing means spatially disposed from one another and both adapted to receive said internal shaft means extending therethrough to facilitate rotational movement thereof relative to said main housing means.

15. A double reduction gear drive means for powering movement of a boat lifting cable as defined in claim 1 wherein said main housing means further includes a main bearing journal means fixedly mounted within said main housing chamber means, said secondary input shaft bearing means and said first internal shaft bearing means both being mounted within said main bearing journal means to maintain fixed relative positioning thereof relative to said main housing means.

16. A double reduction gear drive means for powering movement of a boat lifting cable as defined in claim 1 further comprising a first output shaft bearing means and a second output shaft bearing means mounted within said main housing means spatially disposed from one another and adapted to receive said output shaft means extending therethrough to facilitate rotational movement thereof relative to said main housing means.

17. A double reduction gear drive means for powering movement of a boat lifting cable as defined in claim 16 wherein said second output shaft bearing means is mounted within said main housing means at a position immediately adjacent said output aperture means to facilitate rotation of said output shaft means relative to said main housing means.

18. A double reduction gear drive means for powering movement of a boat lifting cable as defined in claim 16 wherein said main housing means includes an enlarged wall section adjacent said first output shaft bearing means to facilitate placement and lubrication thereof.

19. A double reduction gear drive means for powering movement of a boat lifting cable as defined in claim 1 wherein said output gear means comprises a helical flange gear.

20. A double reduction gear drive means for powering movement of a boat lifting cable as defined in claim 1 wherein said input shaft means and said internal shaft means are both oriented approximately vertically parallel to one another.

21. A double reduction gear drive means for powering movement of a boat lifting cable as defined in claim 1 wherein said input shaft means extends generally vertically and said boat lifting spool means is attached thereto and extends generally horizontally and approximately perpendicularly with respect to said input shaft means.

22. A double reduction gear drive means for powering movement of a boat lifting cable as defined in claim 1 wherein said worm gear means has a lead angle of less than seven degrees and thirty seconds in order to be self-locking in engagement with respect to said output gear means.

23. A double reduction gear drive means for powering movement of a boat lifting cable as defined in claim 1 wherein said housing means includes an interior housing wall therein extending across said main housing chamber means to define a first housing member and a second housing member within said main housing means with said input gear means and said main internal gear means engaged and located within said first housing member and said worm gear means and said output gear means engaged and located within said second housing member.

24. A double reduction gear drive means for powering movement of a boat lifting cable comprising:
   A. a main housing means defining a main housing chamber means therewithin, said main housing means defining an input aperture means and an output aperture means therein with both being in fluid flow communication with respect to said main housing chamber means;
   B. an input shaft means rotatably movably mounted with respect to said main housing means and extending through said input aperture means into said main housing chamber means;
   C. a primary input shaft bearing means mounted in said main housing means immediately adjacent said input aperture means, said primary input shaft bearing means adapted to receive said input shaft means therethrough to facilitate rotational movement thereof relative to said main housing means;
   D. a secondary input shaft bearing means mounted in said housing means spatially disposed from said primary input shaft bearing means and adapted to receive said input shaft means therethrough to facilitate rotational movement thereof relative to said main housing means;
   E. an input gear means secured onto said input shaft means at a position within said main housing chamber means;
   F. an internal shaft means rotatably movably mounted within said main housing chamber means of said main housing means extending approximately parallel to said input shaft means and spatially displaced therefrom, said input shaft means and said internal shaft means both being oriented approximately vertically parallel to one another;
   G. a main internal gear means secured onto said internal shaft means to be rotatable therewith and in engagement with respect to said input gear means to be rotatably driven responsive to rotation of said input gear means, said main internal gear means being larger than said input gear means to cause said internal shaft means to rotate at a rotational speed less than the rotational speed of said input shaft means;
   H. a first internal shaft bearing means mounted within said main housing means and adapted to receive said internal shaft means extending therethrough to facilitate rotational movement thereof relative to said main housing means;
   I. a second internal shaft bearing means mounted within said main housing means spatially disposed from said first internal shaft bearing means and adapted to receive said internal shaft means extending therethrough to facilitate rotational movement thereof relative to said main housing means;
   J. a worm gear means secured onto said internal shaft means to be rotatable therewith;
   K. a main bearing journal means fixedly mounted within said main housing chamber means, said secondary input shaft bearing means and said first internal shaft bearing means both being mounted within said main bearing journal means spatially disposed from one another to maintain fixed relative positioning thereof relative to said main housing means;

L. an output shaft means rotatably movably mounted within said main housing chamber means of said main housing means, said output shaft means and said internal shaft means being oriented in a generally vertically extending plane and extending approximately perpendicularly with respect to one another, said output shaft means being partially positioned within said main housing chamber means and extending outwardly therefrom through said output aperture means;

M. a first output shaft bearing means and a second output shaft bearing means mounted within said main housing means spatially disposed from one another and adapted to receive said output shaft means extending therethrough to facilitate rotational movement thereof relative to said main housing means;

N. an output gear means secured onto said output shaft means to be rotatable therewith and being positioned in engagement with respect to said worm gear means to be rotatable responsive to rotation thereof, said output gear means being larger than said worm gear means to cause said output shaft means to rotate at a rotational speed less than the rotational speed of said internal shaft means;

O. a boat lifting cable spool means attached to said output shaft means outside of said main housing chamber means and being rotatably therewith to control winding of at least one boat lifting cable thereupon, said boat lifting cable spool means extending generally horizontally and approximately perpendicularly with respect to said internal shaft means and said input shaft means; and P. a drive means operatively coupled with respect to said input shaft means for selectively driving thereof to cause rotation of said boat lifting cable spool means with more torque and less rotational velocity than said drive means for controlling movement of boat lifting cable attached thereto.

25. A double reduction gear drive means for powering movement of a boat lifting cable comprising:

A. a main housing means defining a main housing chamber means therewithin, said main housing means defining an input aperture means and an output aperture means therein with both being in fluid flow communication with respect to said main housing chamber means;

B. an input shaft means rotatably movably mounted with respect to said main housing means and extending through said input aperture means into said main housing chamber means;

C. a primary input shaft bearing means mounted in said main housing means immediately adjacent said input aperture means, said primary input shaft bearing means adapted to receive said input shaft means therethrough to facilitate rotational movement thereof relative to said main housing means;

D. a secondary input shaft bearing means mounted in said housing means spatially disposed from said primary input shaft bearing means and adapted to receive said input shaft means therethrough to facilitate rotational movement thereof relative to said main housing means;

E. an input gear means secured onto said input shaft means at a position within said main housing chamber means;

F. an internal shaft means rotatably movably mounted within said main housing chamber means of said main housing means extending approximately parallel to said input shaft means and spatially displaced therefrom, said input shaft means and said internal shaft means both being oriented approximately vertically parallel to one another;

G. a main internal gear means secured onto said internal shaft means to be rotatable therewith and in engagement with respect to said input gear means to be rotatably driven responsive to rotation of said input gear means, said main internal gear means being larger than said input gear means to cause said internal shaft means to rotate at a rotational speed less than the rotational speed of said input shaft means;

H. a first internal shaft bearing means mounted within said main housing means and adapted to receive said internal shaft means extending therethrough to facilitate rotational movement thereof relative to said main housing means;

I. a second internal shaft bearing means mounted within said main housing means spatially disposed from said first internal shaft bearing means and adapted to receive said internal shaft means extending therethrough to facilitate rotational movement thereof relative to said main housing means;

J. a worm gear means secured onto said internal shaft means to be rotatable therewith, said worm gear means being positioned at an intermediate position on said internal shaft means spatially disposed from said main internal gear means;

K. a main bearing journal means fixedly mounted within said main housing chamber means, said secondary input shaft bearing means and said first internal shaft bearing means both being mounted within said main bearing journal means spatially disposed from one another to maintain fixed relative positioning thereof relative to said main housing means;

L. an output shaft means rotatably movably mounted within said main housing chamber means of said main housing means, said output shaft means and said internal shaft means being oriented in a generally vertically extending plane and extending approximately perpendicularly with respect to one another, said output shaft means being partially positioned within said main housing chamber means and extending outwardly therefrom through said output aperture means;

M. a first output shaft bearing means and a second output shaft bearing means mounted within said main housing means spatially disposed from one another and adapted to receive said output shaft means extending therethrough to facilitate rotational movement thereof relative to said main housing means;

N. an output gear means secured onto said output shaft means to be rotatable therewith and being positioned in engagement with respect to said worm gear means to be rotatable responsive to rotation thereof, said output gear means being larger than said worm gear means to cause said output shaft means to rotate at a rotational speed less than the rotational speed of said internal shaft means;

O. a boat lifting cable spool means attached to said output shaft means outside of said main housing chamber means and being rotatably therewith to control winding of boat lifting cable thereupon, said boat lifting cable spool means extending generally horizontally and approximately perpendicularly with respect to said internal shaft means and said input shaft means;

P. a drive means operatively coupled with respect to said input shaft means for selectively driving thereof to cause rotation of said boat lifting cable spool means with more torque and less rotational velocity than said drive means for controlling movement of boat lifting cable attached thereto, said drive means including a drive shaft means extending outwardly therefrom and rotationally driven thereby, said drive shaft means being coupled to said input shaft means for selectively causing rotation thereof;

Q. a boat lifting cable means secured to said boat lifting cable spool means for controlling winding thereof, said boat lifting cable means including a first boat lifting cable and a second boat lifting cable attached to said boat lifting cable spool means at spatially disposed positions relative to one another;

R. a coupling means attached to said drive shaft means and to said input shaft means for causing simultaneous similar movement therebetween, said coupling means including:
  (1) a first key means positioned between said drive shaft means and said coupling means for selectively achieving securement therebetween;
  (2) a second key means positioned between said input shaft means and said coupling means for selectively achieving securement therebetween; and S. a coupling housing means extending around said coupling means, said coupling housing means defining a coupling chamber means therewithin and a coupling input aperture means and a coupling output aperture means in communication therewith, said coupling housing means being securable with respect to said drive means with said drive shaft means thereof extending into said coupling housing means through said coupling input aperture means, said coupling means also being securable with respect to said main housing means with said coupling output aperture means in registration with respect to said main housing input aperture means and with said input shaft means extending through said coupling output aperture means into said coupling chamber means to a position adjacent said drive shaft means, said coupling means being rotatably movable within said coupling chamber means and secured to said drive shaft means and said input shaft means to cause similar simultaneous rotational movement thereof, said coupling housing means including a coupling housing bearing means mounted therewithin immediately adjacent said coupling output aperture means and being adapted to receive said input shaft means therethrough to facilitate rotation thereof relative to said coupling housing means.

* * * * *